Oct. 28, 1969 B. W. BROWN 3,475,712
WATERPROOF STRAIN GAUGE ASSEMBLY AND METHOD OF MAKING SAME
Filed Nov. 7, 1967 3 Sheets-Sheet 1
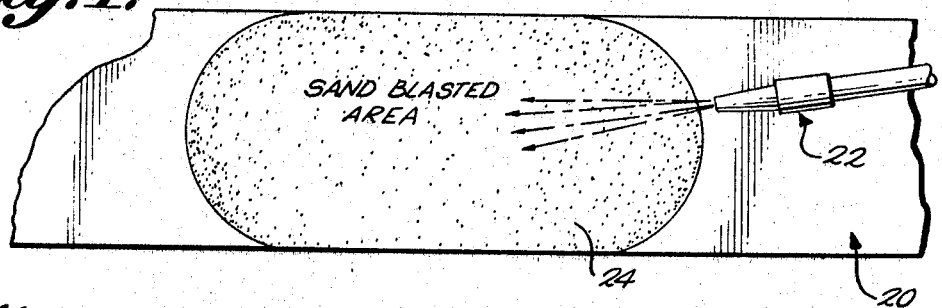
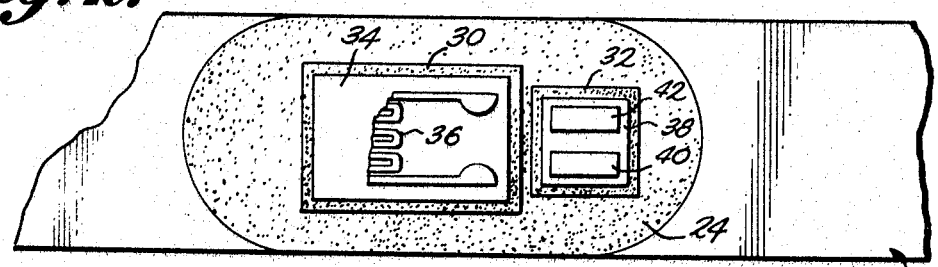
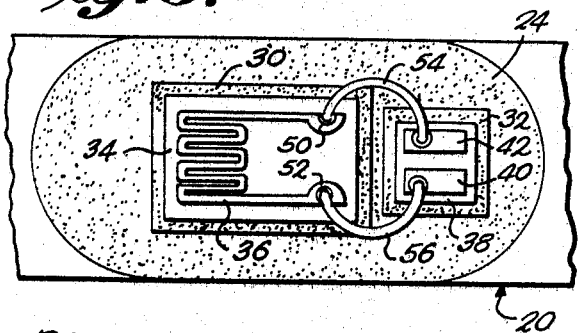
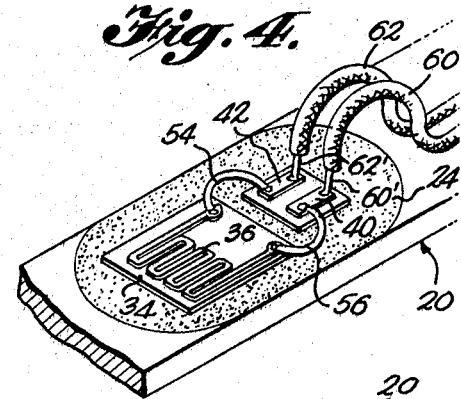
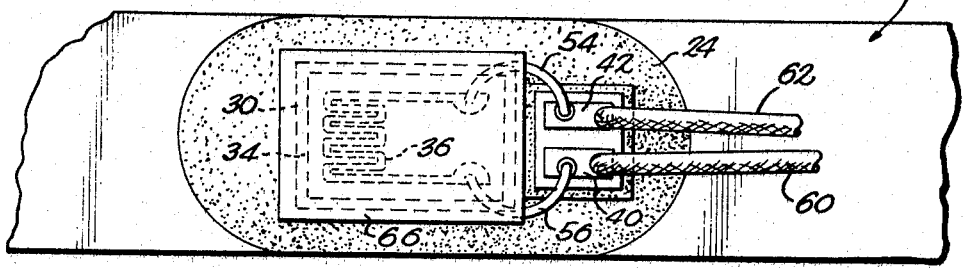
INVENTOR
Buist W. Brown
BY Shoemaker and Mattare
ATTORNEYS

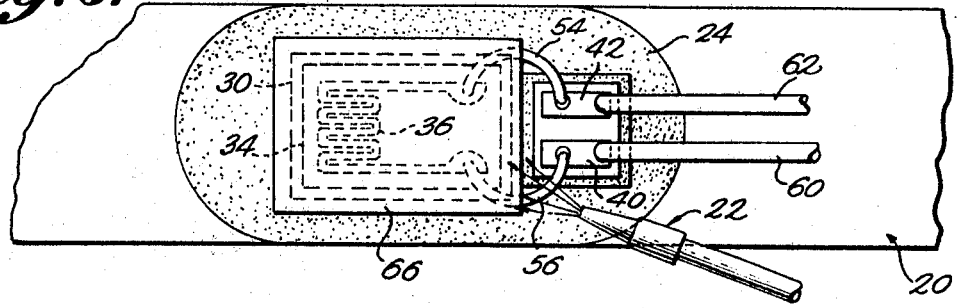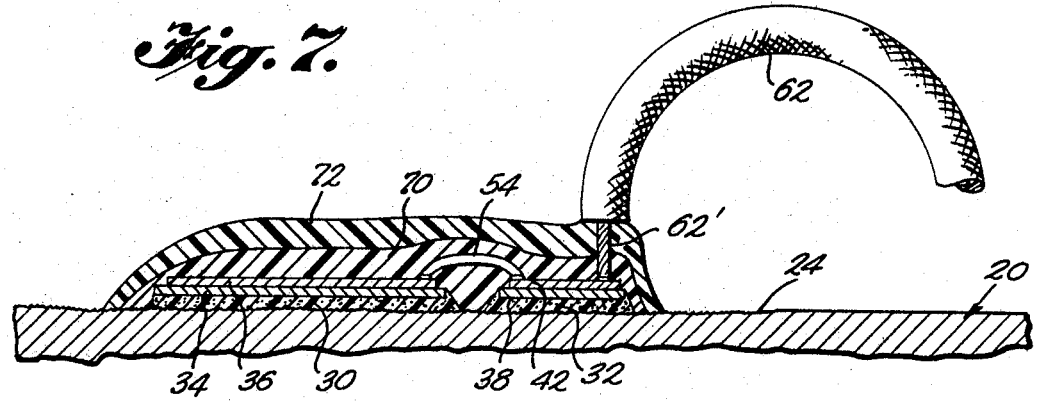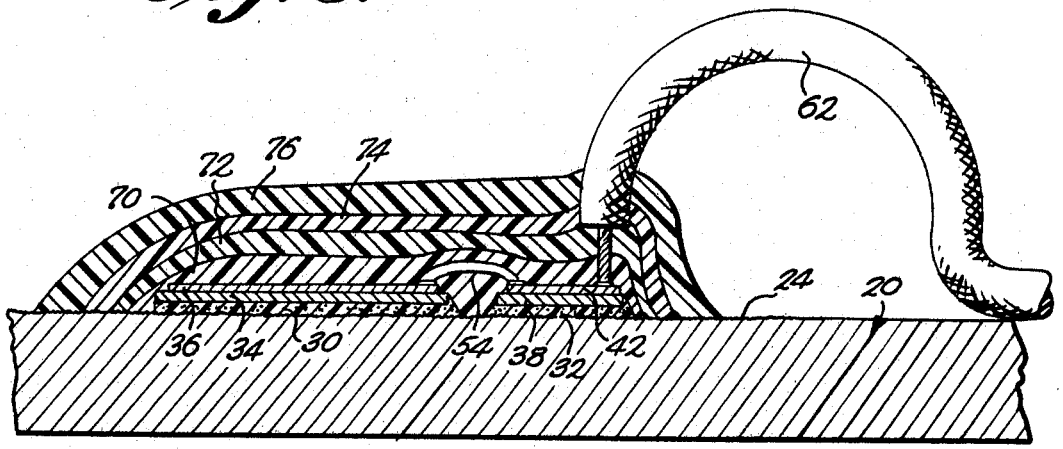

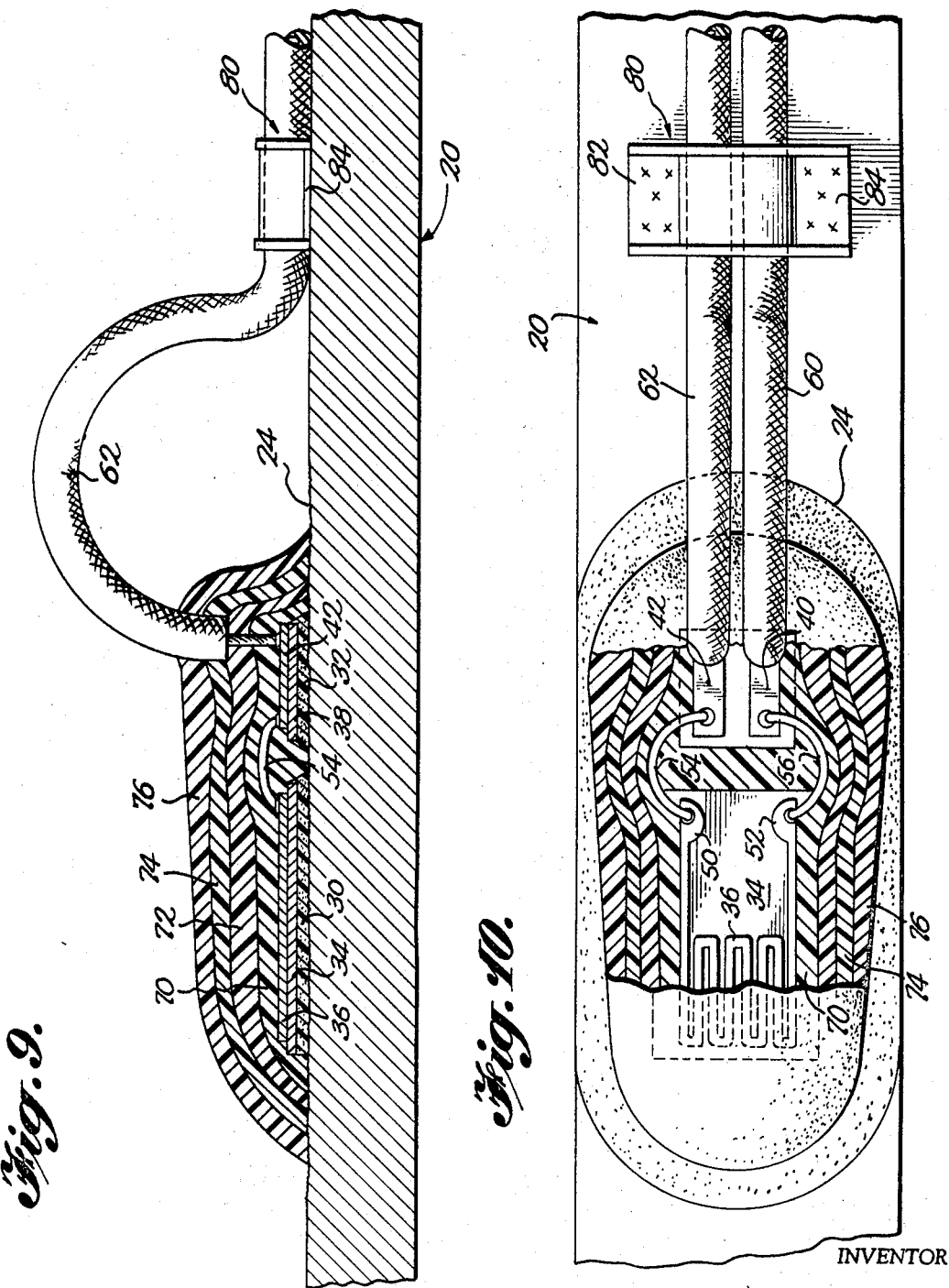

United States Patent Office

3,475,712
Patented Oct. 28, 1969

3,475,712
WATERPROOF STRAIN GAUGE ASSEMBLY AND
METHOD OF MAKING SAME
Buist W. Brown, Hampton, Va., assignor to Newport
News Shipbuilding and Dry Dock Company, Newport
News, Va., a corporation of Virginia
Filed Nov. 7, 1967, Ser. No. 681,161
Int. Cl. G01l *1/22;* H01c *17/00*
U.S. Cl. 338—2                                    8 Claims

ABSTRACT OF THE DISCLOSURE

A strain gauge and separate spaced tab means are mounted on a piece of material and are connected with one another. Lead wires are in turn connected to the tab means, and the entire assembly is then completely covered with a plurality of layers of plastic material some of which are of different composition so as to completely seal the over-all assembly.

BACKGROUND OF THE INVENTION

The present invention relates to a strain gauge adapted to be mounted on any type of material, usually metal or plastic, which is to be immersed in water or some liquid for extended periods of time.

Efforts have been made in the prior art to provide waterproof strain gauge assemblies, and a typical example of a prior art arrangement is illustrated in U.S. Patent No. 3,089,107. One of the difficulties of this type of structure wherein some sort of wax and a synthetic rubber are employed is the problem of obtaining proper adhesion and a good bond between the material to be strain gauged and the various other components of the over-all assembly.

Additionally, it has been found that if the lead wires connected from the strain gauge assembly to suitable detecting apparatus extend substantially parallel with the surface of the member being strain gauged, it is difficult to obtain a good seal, and furthermore, the lead wires tend to pull away from the strain gauge when tension is applied thereto.

Such prior art arrangements have also employed substances such as wax and other materials which do not provide an effective waterproof seal when immersed in a liquid over long periods of time.

SUMMARY OF THE INVENTION

The present invention employs a novel arrangement wherein certain portions are sandblasted so as to provide good adhesion between such portions and adjacent components, and further wherein the particular materials employed provide a very good bond with one another.

The lead means connected with the separate tab means of the present invention extends substantially perpendicular thereto and a curved standoff portion is provided adjacent thereto so that a good seal can be obtained when the sealing means is applied to the apparatus; and further, the lead means is held in place by suitable support means so that the over-all arrangement is adapted to prevent the lead means from pulling away from its point of interconnection with the tab means.

The sealing means of the present invention is of unique construction in that a plurality of layers of plastic material are provided, the layers of plastic material including synthetic resin and epoxy resin, these layers of plastic material cooperating to provide a very effective and long-lasting waterproof seal about the components of the strain gauge assembly.

An object of the present invention is to provide a new and novel waterproof strain gauge assembly and method of making same wherein a good bond is provided between the various portions of the assembly; and wherein the electrical lead means does not tend to pull away from the structure; and further wherein a good long-term waterproof seal is obtained.

BRIEF DESCRIPTION OF THE DRAWINGS

FIG. 1 is a top view of an initial step of the method of the present invention;

FIG. 2 is a top view of a subsequent step of the method;

FIG. 3 is a top view illustrating a portion of the structure shown in FIG. 2 and representing a further step in the method of making the invention;

FIG. 4 is a top perspective view illustrating a still further step in the method of the present invention;

FIG. 5 is a top view illustrating the step of the method subsequent to that shown in FIG. 4;

FIG. 6 is a top view illustrating a further step in the method of the present invention;

FIG. 7 is a longitudinal sectional view through the assembly of the present invention on an enlarged scale illustrating further steps in the method of the present invention;

FIG. 8 is a view similar to FIG. 7 illustrating still further steps in the method of the invention;

FIG. 9 is a longitudinal section view through the completed assembly of the present invention; and FIG. 10 is a top view partly in section of the structure shown in FIG. 9.

DESCRIPTION OF THE PREFERRED EMBODIMENT

Referring now to the drawings wherein like reference characters designate corresponding parts throughout the several views, as seen in FIG. 1 a member to be strain gauged is indicated generally by reference numeral 20 and may for example comprise any suitable metal or plastic material. Suitable conventional apparatus 22 is provided for sandblasting a relatively flat surface of member 20, and the first step of the method according to the present invention is to sandblast an area indicated by reference numeral 24 and stippled in this figure.

The sandblasted area 24 is then suitably cleaned utilizing a substance such as acetone or the like.

As seen most clearly in FIGS. 2 and 7, the next step is to apply two bodies of adhesive material indicated by reference numerals 30 and 34 to the sandblasted area 24 of member 20. Various types of adhesive substances may be employed, and preferably a contact cement is employed, this type of adhesive substance serving to transmit the strain from member 20 to the strain gauge. A conventional strain gauge is provided including backing material 34 upon which is mounted the metallic portion 36 of the usual construction. Separate tab means is provided and includes a piece of backing material 38 upon which is supported a pair of suitable electrically conductive metallic tabs 40 and 42 spaced from one another. The backing material may be formed in each instance of paper or Bakelite and the like which is an electrical insulator. After applying the two bodies of adhesive substances 30 and 32, the strain gauge and the tab means are mounted in position on these bodies of adhesive substance as illustrated in FIG. 2.

The assembly as shown in FIG. 2 is then cleaned with a suitable substance such as acetone and the like.

As seen in FIG. 3, the strain gauge includes a pair of opposite terminals 50 and 52. The strain gauge is then electrically interconnected with the tab means by suitably connecting the opposite ends of a lead 54 between terminal 50 and tab 42 and similarly electrically connecting the opposite ends of a lead 56 between terminal 52 and tab 40. Leads 54 and 56 may comprise a single strand of copper wire, and a suitable temperature solder is employed for interconnecting leads 54 and 56 with the tabs 40 and 42 which are formed of copper and are adapted to break away relatively easily. After making these solder connections, any rosin which is present is cleaned off of the assembly.

Referring now to FIG. 4, electrical lead means includes a pair of electrical cables 60 and 62 having bared stranded conductors 60' and 62' at the end thereof. The bared conductors are connected to the tabs by soldering conductor 62' to tab 42 and conductor 60' to tab 40. These lead wires are interconnected with the respective tabs so as to extend substantially normally thereto as seen for example in FIG. 7. It will be noted as seen in FIG. 4 that the terminal ends of the lead wires extend normally from the tab means and then form curved portions which comprise the standoff area whereupon the lead wires curve back and are supported upon the surface of member 20. After connecting the lead wires as described, the entire assembly is thoroughly cleaned using acetone or the like.

The interconnection of the lead wires so as to extend normally from the tab means is important in obtaining a complete waterproof seal since when applying the sealing substance about the assembly, good visibility is afforded to personnel carrying out the operation, whereas if the lead wires extended substantially parallel with the surface of member 20, it would not be possible to readily see under the lead wires to determine whether an effective seal had been obtained. Additionally, the provision of the standoff area provides slack in the lead wires which allows for some flexibility, whereas if they were not provided with such a standoff area, any tension applied to the lead wires would tend to pull the lead wires away from the assembly and destroy the waterproof seal.

Referring now to FIG. 5, the assembly is substantially the same as that shown in FIG. 4, except that a substantially rectangular piece of tape or other suitable means has been placed over the strain gauge portion of the assembly to protect the strain gauge.

Referring now to FIG. 6, after applying the protective means 66 in operative position, the apparatus 22 as previously described is again employed for sandblasting the over-all assembly as seen in FIG. 6.

Referring now to FIG. 7, two coats or layers 70 and 72 of a solvent thinned synthetic resin compound are then applied so as to completely cover the strain gauge and the tab means as well as the leads 54 and 56 providing electrical interconnection therebetween and the portion of the lead wires interconnected with the tab means, these layers of material 70 and 72 also covering a portion of the area 24 surrounding the strain gauge and tab means. The synthetic resin compound employed is brushed on liberally and dried into a soft condition and is substantially moisture-proof.

Referring now to FIG. 8, the next step in the method is to apply a first coat 74 of a two-component rubber-like epoxy resin which is adapted to be directly immersed in water. This type of substance is tough and forms a relatively perfect bond to the vinyl insulation of the lead wires 60 and 62. The preferable substance for use in layer 74 is Gagekote #5 manufactured by Wm. T. Bean of Detroit, Mich. After applying layer 74, this layer is then cleaned using a suitable substance such as acetone or the like, and a second coating or layer 76 is applied over layer 74, it being understood that layers 74 and 76 are disposed in surrounding relationship to the entire assembly and to the layers 70 and 72 previously described.

Referring now to FIGS. 9 and 10, a support means 80 is provided formed of steel shim stock, this support means being folded and formed about the lead wires 60 and 62. The opposite ends of support 80 comprise flange portions 82 and 84 adapted to rest on the surface of member 84, these flange portions being spot welded in the operative position illustrated. It is apparent that the support will retain the lead wires in the operative position shown so that the standoff portions of the lead wires will be retained as illustrated during normal use of the apparatus. The completed strain gauge assembly of the present invention has successfully withstood operating pressures of 6,000 p.s.i. for a period of seven days when immersed in liquid, and the assembly will provide a waterproof arrangement when immersed in liquids over extended periods of time. The sandblasting of the different portions of the structure at various stages in the method of making the assembly ensures a good bonding and interconnection of the associated components. The materials employed are such as to provide a good bond with one another and to ensure a waterproof seal. The manner of interconnecting the lead wires with the tab means which in turn are interconnected with the strain gauge reduces the tendency of the lead means from pulling away from the strain gauge assembly.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A waterproof strain gauge assembly comprising a member to be strain gauged, a strain gauge supported by said member, separate tab means supported by said member, and spaced from said strain gauge, means for electrically connecting said strain gauge and said tab means, electrical lead means electrically connected to said tab means, and sealing means completely covering said strain gauge and said tab means to provide a waterproof assembly, said electrical lead means being connected to said tab means so as to extend substantially perpendicularly from said tab means.

2. Apparatus as defined in claim 1 wherein said electrical lead means includes a standoff portion of arcuate configuration adjacent to the point of connection of said electrical lead means to said tab means.

3. Apparatus as defined in claim 2 including support means connected with said member and said electrical lead means for holding a portion of said electrical lead means in operative position.

4. A waterproof strain gauge assembly comprising a member to be strain gauged, a strain gauge supported by said member, separate tab means supported by said member and spaced from said strain gauge, means for electrically connecting said strain gauge and said tab means, electrical lead means electrically connected to said tab means, and sealing means completely covering said strain gauge and said tab means to provide a waterproof assembly, said sealing means also covering said means electrically connecting said strain gauge and said separate tab means as well as a portion of the surrounding area of said member adjacent to said strain gauge and to said separate tab means, said sealing means also covering the portion of said electrical lead means which extends adjacent to and perpendicular from said separate tab means.

5. A waterproof strain gauge assembly comprising a member to be strain gauged, a strain gauge supported by said member, separate tab means supported by said member and spaced from said strain gauge, means for electrically connecting said strain gauge and said tab means, electrical lead means electrically connected to said tab means, and sealing means completely covering said strain gauge and said tab means to provide a watedproof assembly, said electrical lead means extending adjacent to said tab means in a direction substantially perpendicular thereto and defining a curved portion spaced from said tab means, support means for securing a part of said electrical lead means outwardly of said curved portion to said member to be strain gauged, said sealing means including a plurality of layers of plastic material which also completely cover said means providing an electrical connection between said strain gauge and said tab means and also covering a portion of said electrical lead means adjacent to said tab means, said sealing means including at least one layer of a synthetic resin and one layer of an epoxy resin disposed adjacent to one another.

6. The method of making a waterproof strain gauge assembly comprising providing a member to be strain gauged, securing a strain gauge to said member to be strain gauged, securing separate tab means to said member to be strain gauged in spaced relationship to said strain gauge, electrically connecting said strain gauge and said separate tab means, connecting electrical lead means to said tab means, and applying sealing means to completely cover said strain gauge and said tab means as well as the electrical connection between said strain gauge and said tab means and a portion of said electrical lead means, said lead means being connected with said tab means so as to extend substantially perpendicular thereto adjacent to the tab means.

7. The method of making a waterproof strain gauge assembly comprising providing a member to be strain gauged, securing a strain gauge to said member to be strain gauged in spaced relationship to said strain gauge, electrically connecting said strain gauge and said separate tab means, connecting electrical lead means to said tab means, and applying sealing means to completely cover said strain gauge and said tab means as well as the electrical connection between said strain gauge and said tab means and a portion of said electrical lead means, sandblasting the assembly after electrically connecting said strain gauge with said tab means and connecting the electrical lead means to the tab means and prior to applying the sealing means thereto.

8. The method as defined in claim 7 including the step of providing protective means over said strain gauge before carrying out said sandblasting step.

References Cited

UNITED STATES PATENTS

| 2,390,038 | 11/1945 | Ruge | 338—3 |
| 2,423,842 | 7/1947 | McHenry | 338—2 |
| 3,005,176 | 10/1961 | Starr | 338—2 |
| 3,008,109 | 11/1961 | Starr | 338—2 |

OTHER REFERENCES

The strain Gage Primer, by C. C. Perry and H. R. Lissner, 2nd ed., McGraw–Hill Book Co., New York, 1955, pp. 175–178.

REUBEN EPSTEIN, Primary Examiner

U.S. Cl. X.R.

29—610, 613, 621